United States Patent Office 3,592,743
Patented July 13, 1971

3,592,743
MULTIPLE RE-USE OF WATER
Walter H. Chapman and John F. Eichelmann, Jr., El Paso, Tex., assignors to El Paso Southern Company, El Paso, Tex.
Filed Mar. 26, 1968, Ser. No. 716,222
Int. Cl. B01d 1/00; C02b 1/06
U.S. Cl. 203—10
8 Claims

ABSTRACT OF THE DISCLOSURE

This invention relates to the treatment of saline, brackish or other high mineral content water to provide effluent waters for domestic and industrial usage and to the treatment of the domestic and industrial waste water for multiple reuse so as to solve both water supply and waste water pollution problems. The invention combines a demineralization system with a system utilizing a relatively non-volatile fluidizing liquid and capable of operating on waste waters of relatively high solids content, the latter system receiving high mineral content effluent from the demineralizer as well as waste waters from the industrial and/or domestic sources. Potable water and low mineral content waters for industrial use are produced and substantially all water is reused excepting that lost by evaporation to the atmosphere or by use in irrigation. The system is particularly well adapted for small communities having an adjacent industrial plant. The water supply and waste disposal problems for both town and plant are solved simultaneously.

BACKGROUND

The attention of the civilized world of necessity is being increasingly focused on air and water pollution problems. Indeed it is evident that man's existence in his environment, or at least our present way of life, will soon depend on his ability to handle his own metabolic and industrial wastes. There have been many proposals for treatment of sewage and garbage and some, such as that of U.S. Pat. 3,296,122, have been developed to the extent of providing an effluent water said to be suitable for a potable water supply. In general, however, the purification of sewage water to the extent required to provide a potable effluent has not been economically feasible.

A system has also been developed for dehydrating sewage sludge and the like, wherein single or multiple stage evaporators are used and the waste solids are kept in suspended and pumpable condition through the use of a relatively non-volatile fluidizing liquid, such as animal or vegetable fats and oils, petroleum oils and their fractions and derivatives including fuel oil, glycerine, glycols and the like. This system, hereinafter identified as the Carver-Greenfield process, is described in U.S. Pats. Nos. 3,251,-398 and 3,304,991. In general, the system involves mixing the sewage sludge with the fluidizing oil, subjecting the mixture to evaporative dehydration, condensing the effluent vapors, separating solids from the residual oil and recycling the latter for admixture with additional sewage sludge. The solids which are high in organic content can be burned for fuel and the condensate is of sufficient purity to be discharged into streams or rivers. The cost of the system, as so operated, is restrictive of its use.

The problem of obtaining pure water in areas in which the only available sources of any quantity are saline waters, brackish waters or other waters of high mineral content have long been known. Various demineralizing processes have been developed including multi-stage vacuum dehydration, ion exchange units, reverse osmosis, and electrodialysis. All of these processes, however, provide, in addition to relatively pure, low-mineral content water (distilled water in the case of vacuum dehydration), an effluent or blow down water which is high in mineral content and which must be disposed of. It is no longer feasible or, in fact, permissible in some areas to run this effluent into ponds or the like where it may raise the mineral content of underground streams.

SUMMARY OF THE INVENTION

The present invention provides a process for water treatment and reuse which solves many of the problems discussed above. The process comprises treating mineral-containing water, such as well water, saline water, brackish water, depending on the available source, by one of the known demineralizing procedures to provide a substantially demineralized fraction and a fraction concentrated in mineral content, supplying the demineralized water to the industrial and/or domestic service, subjecting the concentrated mineral containing water, preferably along with industrial and/or domestic waste waters, to dehydration by the Carver-Greenfield process, (i.e. by mixing with a relatively non-volatile oil to provide a pumpable slurry, evaporating the water from the slurry, separating residual solids from the oil and recycling the oil) to provide a water effluent, and returning at least a portion of said effluent water to the industrial use. The solids, which are in dry granular form, are easily disposed of. Depending upon the particular plant, they may have varied commercial value, for fertilizer, chemical recovery, fuel etc. In the absence of such uses they may be transported to a lined disposal pit.

Where the source of the water is sufficiently free of biological impurities (as in the instance of many well waters) to be suitable, except for high mineral content, for drinking water, it is contemplated that it may be blended in part with the demineralized water to provide a balanced mineral content water for domestic use.

The use of the substantially demineralized water for industrial purposes such as for boiler water, in cooling towers, cooling water for engines, condensers and the like, considerably cuts down on scaling problems and reduces water blow-down. Any blow-down waters produced are readily incorporated in the Carver-Greenfield treatment and provide no loss or waste disposal problems. The use of demineralized water in cooling systems also permits the water to be recirculated to a much greater extent than usual practice resulting in a savings of expensive corrosion inhibitors. Again any waters purged from the cooling systems are returned to the Carver-Greenfield system.

The invention is particularly useful in arid regions, such as the Southwestern United States where water is scarce and what water is available is usually of high mineral content. It may be installed for natural gas treating plants, pumping stations, petrochemical plants, power stations, and other combinations of industrial and associated domestic facilities. The invention provides a permanent solution to water supply and water pollution abatement, free from public liabilities, as long as the plant is in operation. However, it will be understood that the system is by no means limited to small localities or arid regions and the larger the treating system the more economic it becomes. Other examples of use include pulp and paper mills, plants for synthetic plastics and fibers, iron and steel mills, mining industries, and almost any other area requiring industrial and domestic waters.

The economics of the system can be improved by taking advantage of waste heat produced in the industrial plant for providing at least some of the heat energy to the demineralization and waste dehydration systems. Industrial water produced in the latter system can sometimes be used to advantage in purification of polluted air from the plant thereby solving still another pollution problem.

The invention will be further described in connection with the attached drawings, which schematically illustrate representative embodiments. In the drawings.

Figure 1:
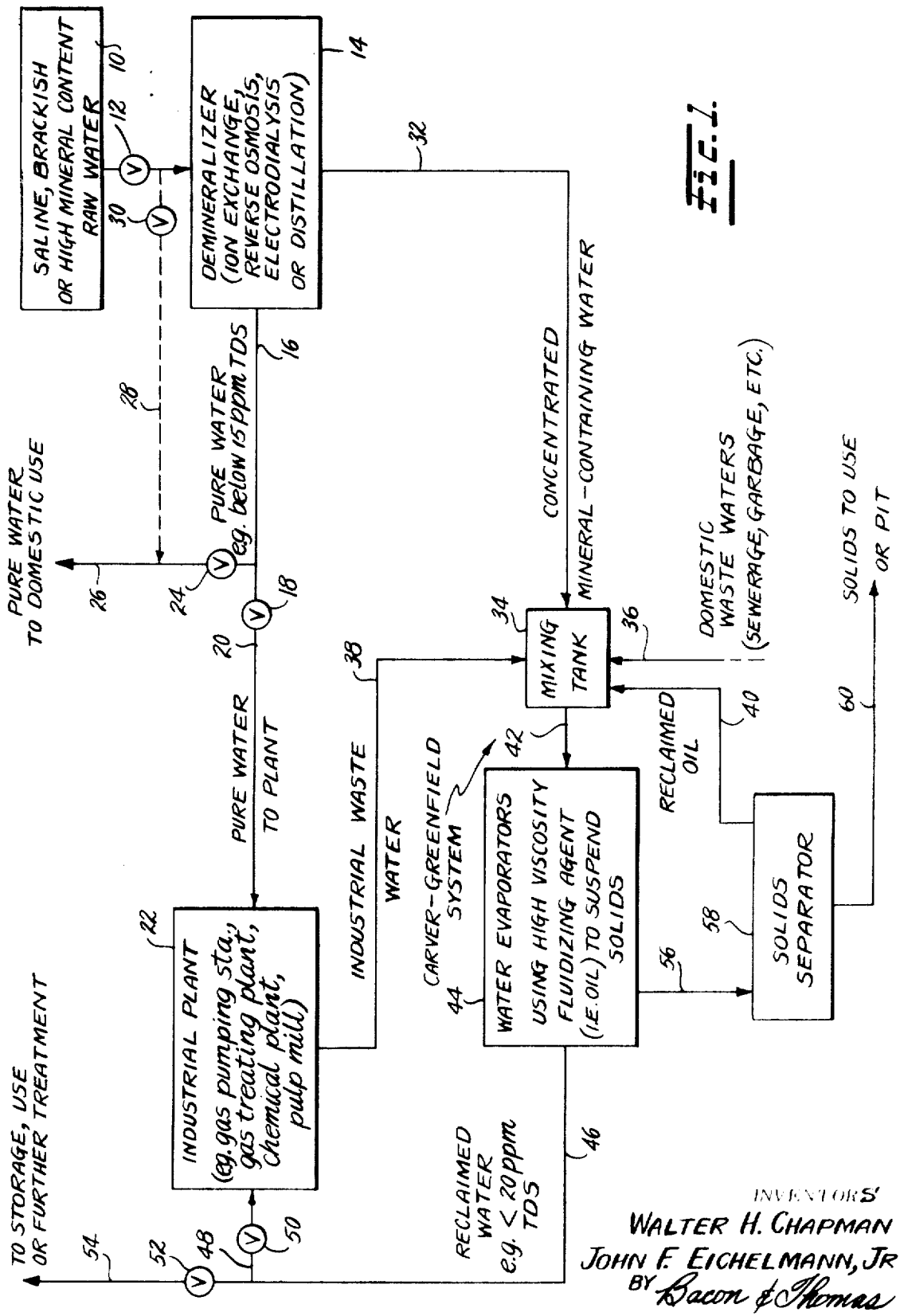
FIG. 1 is a schematic flow diagram broadly illustrating the general concepts of the invention.

Turning now to FIG. 1 of the drawings, there is shown a source 10 of saline, brackish or high mineral content raw water. Typically, this water may contain 500 to 3000 parts per million total dissolved solids or more. If the source is a deep well it is usually of sufficient purity, other than its high mineral content, to be used for potable water. This water is pumped through a valve 12 to a demineralizer 14 which may be an ion exchange apparatus, reverse osmosis apparatus, electrodialysis apparatus or distillation apparatus. These units are well known in the art and require no detailed description herein.

The demineralizer produces a pure water effluent shown at line 16 which should contain a low total dissolved solids, e.g. less than 15 p.p.m. Where multiple effect vacuum evaporators are used, the pure water effluent will of course be substantially devoid of mineral content. The pure water effluent through line 16 is delivered through valve 18 to line 20 and to an industrial plant designated by block 22. A portion of the pure water is withdrawn through valve 24 and line 26 to provide water for domestic use. In order to provide a water of balanced mineral content, a portion of the high mineral content water may be blended into the pure water through line 28 and valve 30. By a suitable adjustment an ideal drinking water can be produced.

The industrial plant 22 may be a natural gas pumping station, natural gas treating plant, chemical plant, refinery, pulp mill, power plant or the like. Such plants have numerous requirements for water. Thus water is required for steam boilers, gas turbines, reciprocating engines, cooling towers, gas scrubbers and various other uses. By utilizing the water effluent 20, having little or no mineral content, for steam boilers, cooling towers and the like, scaling problems are materially reduced.

Regardless of the type of demineralizer used, there is always produced a concentrated mineral-containing water. This water may be the result of blow-down of the evaporators in distillation apparatus, or may be the concentrated effluent produced by ion exchange or by reverse osmosis and electrodialysis apparatus. This highly concentrated mineral-containing effluent is withdrawn through line 32 and introduced into a mixing tank 34 comprising part of a so-called Carver-Greenfield system, such as that illustrated in the aforementioned Pats. 3,251,398 and 3,304,991. The mixing tank 34 also receives domestic waste waters such as sewage, garbage and the like from the houses associated with the industrial plants. Such waste is introduced into the mixer 34 through line 36.

Further, in accordance with the invention, the industrial waste waters from the plant 22 are collected and returned through line 38 to the mixing tank 34. The combined waste waters are mixed with reclaimed fluidizing oil which is recirculated through line 40 into the mixing tank 34 and the fluidized sludge mixture is introduced through line 42 into the water evaporators 44 of the Carver-Greenfield system. In these evaporators substantially all of the water is removed and the solids remain suspended in the fluidizing oil. This oil typically may be fuel oil.

The condensate water effluent from the Carver-Greenfield evaporator is withdrawn through line 46 and recycled to the plant 22 through line 48 and valve 50 for use in any desired area. Because of its low mineral content, that is, less than about 15 p.p.m. total dissolved solids, it can, like the pure water from line 20, be used in cooling towers for make up water and many other uses wherein scaling problems would normally be encountered. Any excess water not used in the palnt can be withdrawn through valve 52 and line 54 for storage or if desired, further treatment for domestic use. It can also be used for such purposes as irrigation without detrimentally affecting the plant or biological life.

Returning now to the Carver-Greenfield system, the dehydrated sludge consisting of solids suspended in oil is withdrawn through line 56 to a solids separator 58 which may be a centrifuge or the like. The reclaimed oil is recirculated through line 40 to the mixing tank 34 as previously described and the solids which are withdrawn through line 60, and are in the form of granular easily handled particles, are sent to storage for commercial use or to a waste pit. These solids in an area in which there are relatively few houses serving an industrial plant using large quantities of water will have a high mineral content in proportion to their organic content. In this instance the solids will be more useful for the mineral content than for fuel value.

Figure 2:
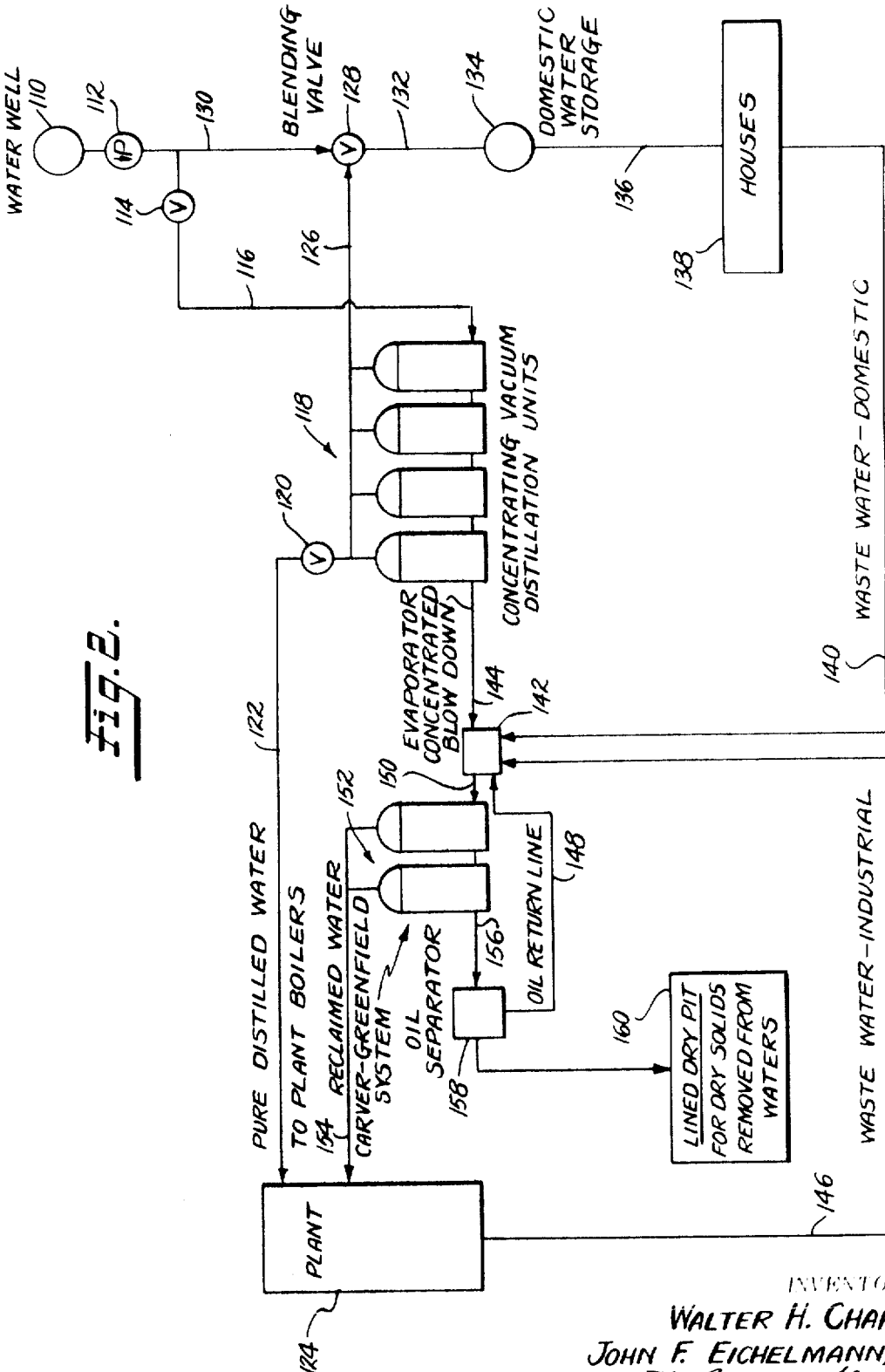
FIG. 2 is a schematic flow diagram of a typical installation for a natural gas treating plant and associated domestic facilities in an area served by a deep water well producing water of high mineral content.

FIG. 2 illustrates a water well 110 from which mineral containing water is pumped by pump 112 through valve 114 and line 116 to concentrating vacuum distillation units generally designated at 118. A portion of the pure water produced is withdrawn through valve 120 and line 122 to serve the plant 124. Another portion of the pure distilled water is diverted through line 126 and is blended by means of blending valve 128 with mineral-containing water supplied from the pump 112 through branch line 130. A balanced mineral-containing water is supplied through line 132 to a reservoir 134 for domestic water storage. This water is withdrawn through service line 136 to houses generally designated at 138. The waste domestic water, sewage, garbage and the like is collected and supplied through line 140 to the mixer 132 of the Carver-Greenfield system. The concentrated mineral-containing blow-down water from the vacuum distillation units is also supplied to the mixer 142 through line 144. Waste industrial water from the plant 124 is returned through line 146 to the mixer 142. The combined waste waters are fluidized with recycled oil coming from line 148. The fluidized mixed waste waters are supplied by line 150 to the Carver-Greenfield evaporators 152 from which reclaimed water is returned to the industrial plant through line 154. The solids which remain fluidized in the oil are withdrawn through line 156 to the oil separator 158 and are removed therefrom to lined dry pit 160.

One adaptation of the system of FIG. 2 has been designed for a natural gas treating plant at a location housing a total of 17 families. Water containing a total dissolved solid content of 1060 p.p.m. is withdrawn from the water well at the rate of 175 gal. per minute. The concentrating evaporator unit 118 has a capacity of 78,000 lbs. per hour and can supply condensate water at a rate of 69,000 lbs. per hour. This unit is used to supply pure distilled water at a rate of approximately 110,000 gal. per day for the plant and domestic use. The effluents from the evaporators 118 and sewage wastes are supplied to the Carver-Greenfield unit. The feed to this unit amounts to about 9300 lbs. per hour from the concentrating evaporators 118 and about 2500 lbs. per hour in the form of sewage waste. The dissolved solids in the blow-down water amounts to about 95 lbs. per hour. The sewage solids from the domestic facilities amounts to about 0.5 lb. per hour. The recovered condensate from the Carver-Greenfield evaporators amounts to about 12,000 lbs. per hour. The fuel required for the operation is natural gas available at the plant. Heat energy of approximately 17.5 million B.t.u. per hour is supplied from a natural gas fixed boiler which generates steam necessary for the concentrating vacuum distillation unit and for the Carver-Greenfield evaporators. The unit is complete and self-contained requiring only feed water from the well, fuel, cooling water, power, and make up oil for continuous operation. The oil requirement is approximately 20 gal. per day.

Figure 3:
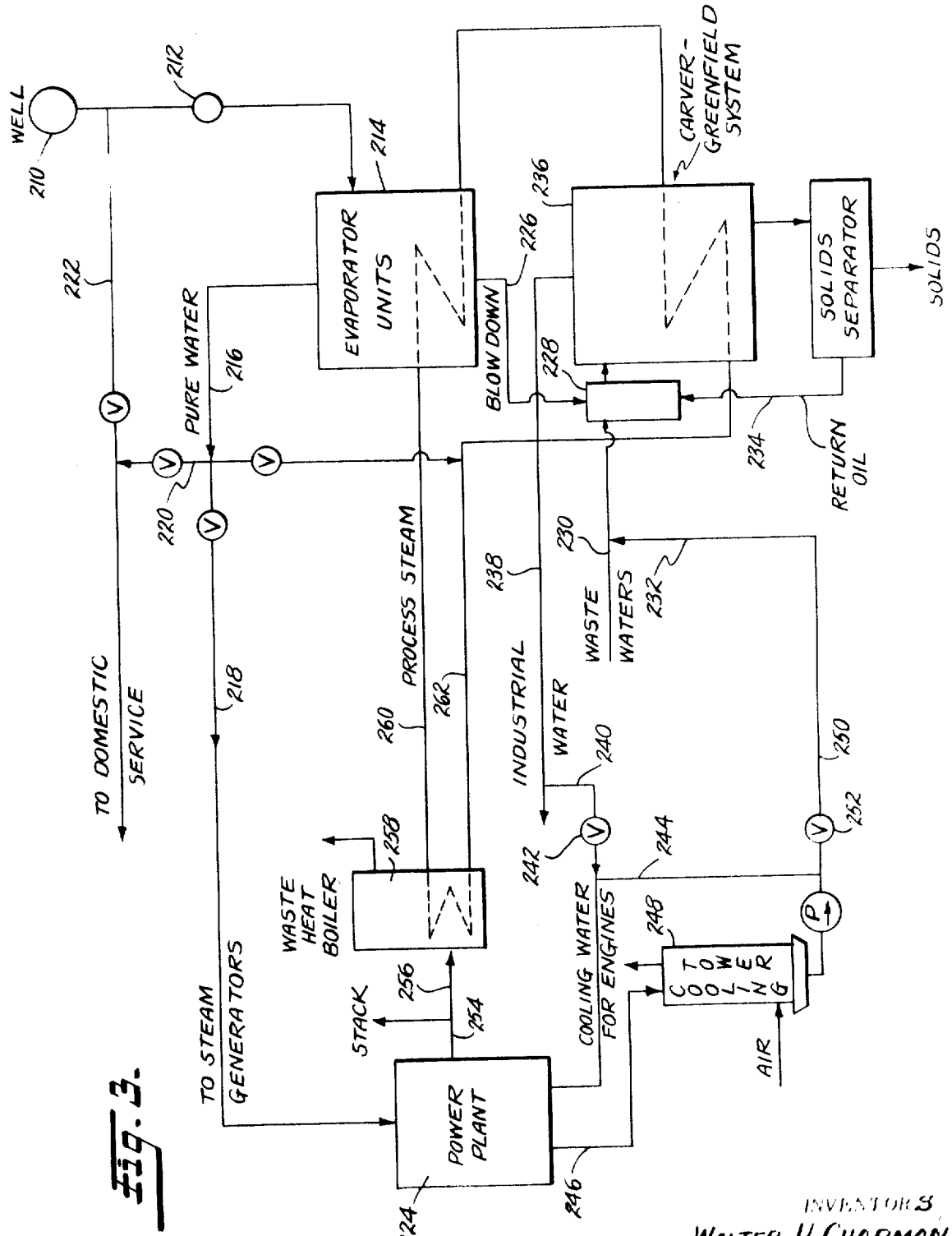
FIG. 3 is a schematic flow diagram similar to FIG. 2 but illustrating the concepts of the invention particularly with respect to a power plant.

In the system shown in FIG. 3 water from well 210 is pumped from through valve 212 to the multiple effect evaporator unit 214 as before, producing pure water which is withdrawn through line 216. This water is supplied to steam generators and the like through line 218 and a portion of it may be withdrawn through branch line 220 for blending with the well water supplied by line 222 for domestic service. The steam generators may be part of a power plant shown at 224. The power plant may also utilize gas turbines or reciprocating engines for generating electrical power. A portion of the pure water may be used in the cooling systems of these units as make up water. Blow-down water from the evaporator units 214 is withdrawn through line 226 to the mixing unit 228 of the Carver-Greenfield system. As before this mixing unit may be supplied with waste waters from domestic sources through line 230 and with return industrial water through line 232. The waste waters are mixed with return oil coming from line 234 and supplied to the Carver-Greenfield evaporators 236. Industrial water is produced through line 238 and in the embodiment shown, may be used in part for make up water for the cooling systems of the engines. Thus a portion of the water is drawn through line 240 and valve 242 into a cooling water stream circulating through line 244. This water has been withdrawn from the cooling systems through lines 246, cooled in tower 248 and pumped back to the system through line 244. In the event of build-up of impurities in the cooling systems, a portion of the water is purged through line 250 and valve 252 and returned to the mixing vessel of the Carver-Greenfield operation.

In the embodiment shown, the stack gases from the power plant, i.e. from fuel fired steam engines or gas turbines, are withdrawn through line 254 and a portion of them are diverted through duct 256 to waste heat boiler 258. This waste heat boiler may be used to generate steam which is circulated through line 260 and return line 262 through the evaporator units of the distillation operation 214 as well as the evaporator units of the Carver-Greenfield evaporators 236. In this manner heat economies are realized in the system.

Figure 4:
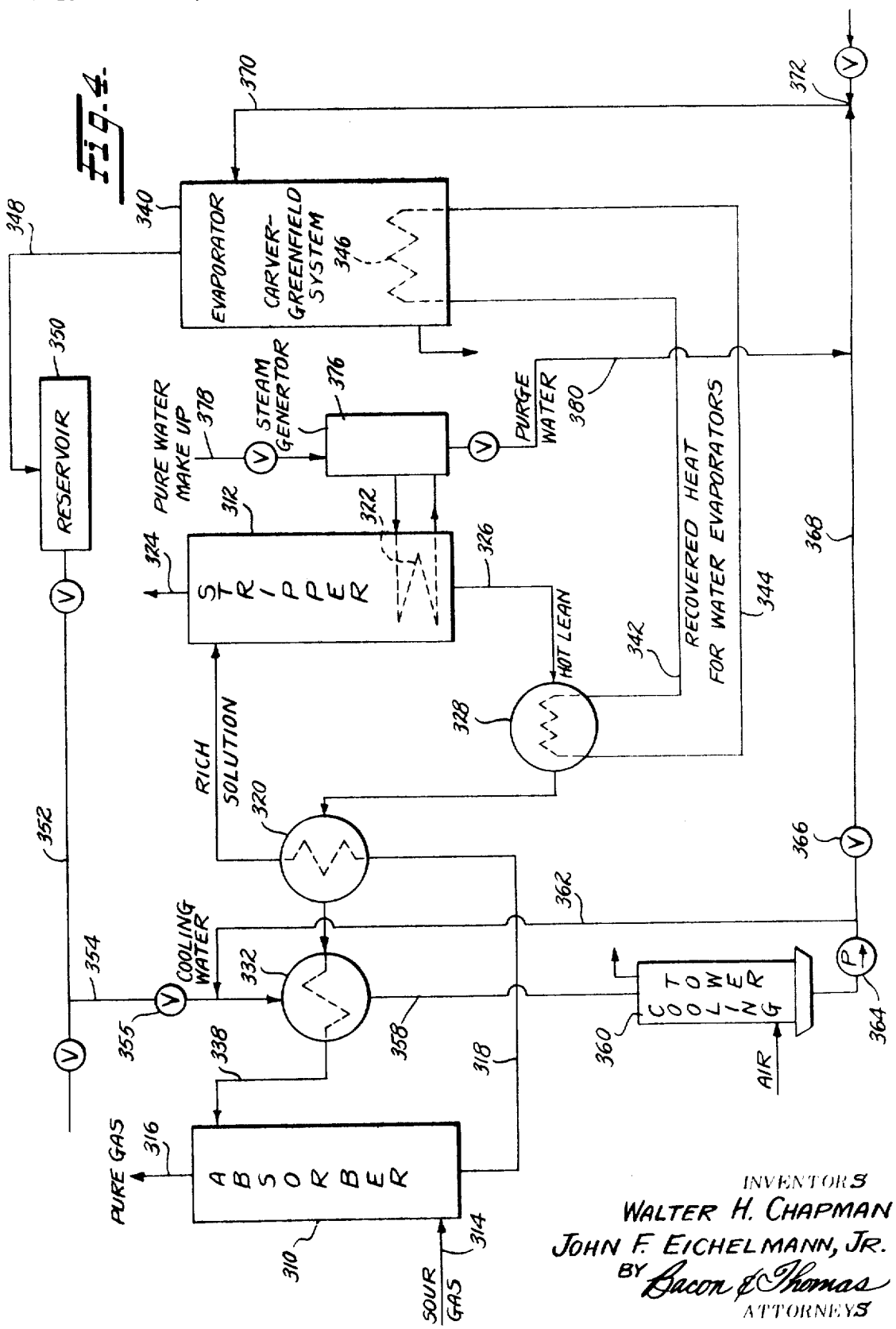
FIG. 4 is a schematic flow diagram similar to FIG. 2 but illustrating the invention particularly with respect to a gas purifying system.

FIG. 4 shows a hook-up which is designed for a gas absorption system for the removal of acidic gases from natural gas. This is a typical operation of natural gas treating plants. The absorption system which comprises an absorber 310 and a stripper 312 is of conventional design such as, for example, shown in Hutchinson Pat. 2,157,068. In this system the sour gas is introduced from line 314 into the bottom of absorber 310 where it is purified by contact with an alkanol amine or other absorption solution. The pure gas leaves the tower through line 316. The rich absorption solution containing $H_2S$, $CO_2$ and the like is withdrawn from the absorber 310 through line 318, passes through heat exchanger 320 where it is heated by indirect heat exchange with returning warm lean solution and is then introduced into the top of stripper 312. This stripper is provided with a steam heating unit 322 which acts to heat up the rich solution and drive off the absorbed acidic components which leave the system through line 324. The hot lean solution is returned through line 326, heat exchanger 328, heat exchanger 320, cooling apparatus 332 and line 338 to the top of the absorber 310. In accordance with this feature of the invention, heat for the Carver-Greenfield evaporator 340 is obtained by use of heat exchange fluid circulating through lines 342 and 344 which transfers heat from the heat exchanger 328 to the heating unit 346 in the Carver-Greenfield evaporator system. It will be understood that additional heat may be supplied to the evaporator in the way of steam from other sources.

Industrial water from the Carver-Greenfield evaporator is withdrawn through lines 348 into reservoir 350 where a portion is withdrawn through line 352 for industrial use. A portion of this water is supplied through line 354 and valve 356 to the cooling apparatus 332 of the absorption system. The heated water from apparatus 332 is withdrawn through line 358 to cooling tower 360. It is then recirculated through line 362 by means of pump 364. Any purge necessary from this circulating system is withdrawn from valve 366 and line 368 and is returned to the Carver-Greenfield evaporator through line 370. Other waste waters domestic or industrial can be added through line 372. Heat for the heating unit 322 of the stripper 312 is supplied by steam generator 376. Pure water make up may be supplied to this generator through line 378 from the distillation equipment not shown, such as illustrated in FIG. 2. Any purge water from the steam generator can be withdrawn through line 380 and combined with the waste waters supplied to the Carver-Greenfield unit.

Figure 5:
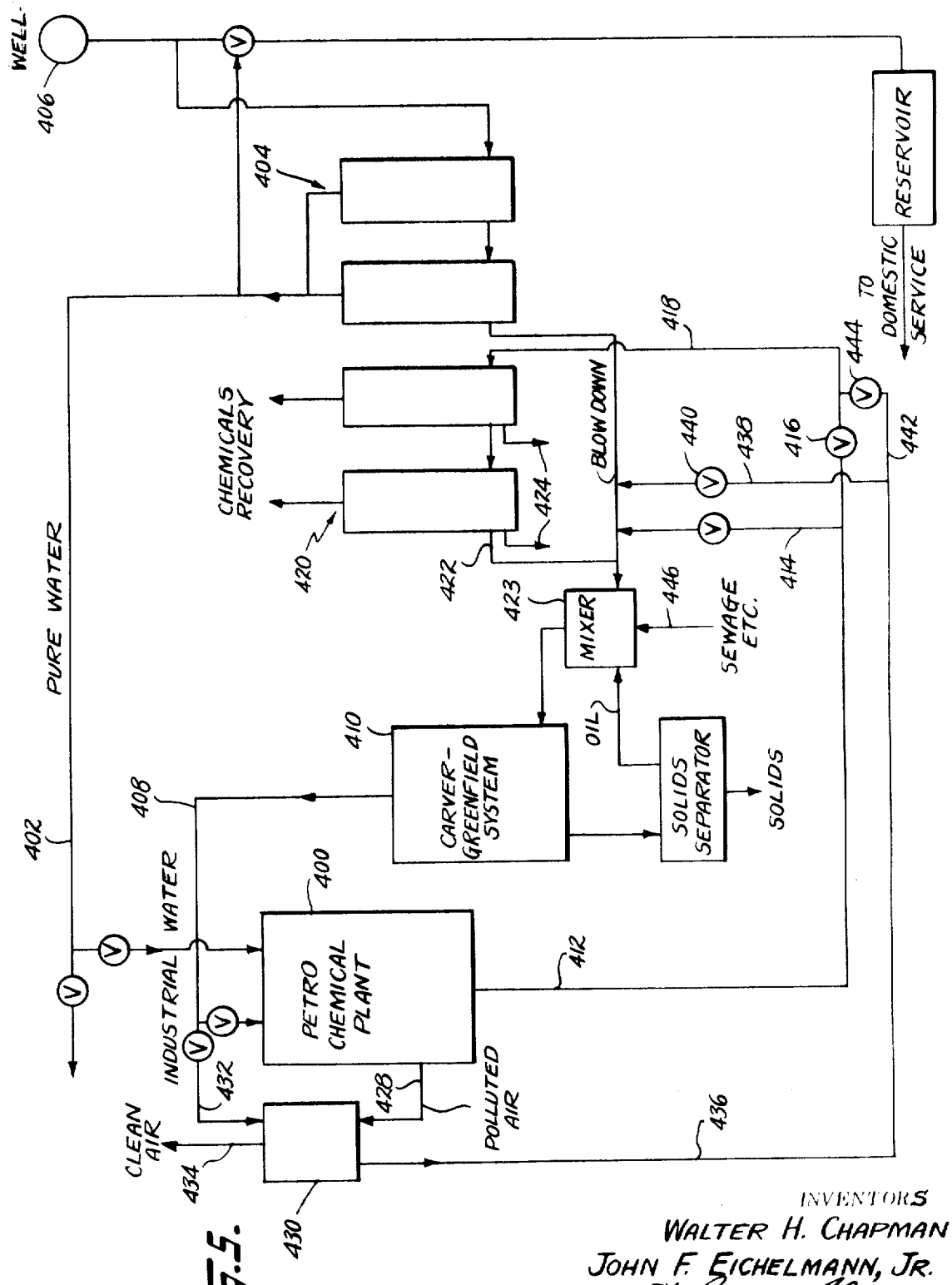
FIG. 5 is a schematic flow diagram illustrating still another adaptation of the invention particularly with respect to a petrochemical plant.

FIG. 5 illustrates the adaptation of the invention to a petrochemical plant shown at 400. Pure water is supplied to this plant through line 402 from concentrating evaporators 404 which, as before, may use raw inlet water from a well 406. Industrial water for cooling purposes and the like is also supplied to the petrochemical plant 400 by means of line 408 from the Carver-Greenfield evaporators 410. Return waste water from the petrochmical plant is withdrawn through line 412 and is either combined with other waste waters through line 414 or is withdrawn through valve 416 and line 418 to chemical recovery unit 420. This recovery unit may be in the form of flash evaporator units whereby any volatile chemicals are removed overhead from the process water which is then withdrawn through line 422 and sent to the mixer 423 of the Carver-Greenfield system. Alternatively, precipitated chemicals can be drawn through lines 424 with the remaining waste water passing off through line 422 to the Carver-Greenfield system.

In a variation of this operation, polluted air from the petrochemical plant may be passed through line 428 to scrubber 430 where it is contacted with industrial water through line 432. The clean air passes off to the atmosphere through line 434 and the water containing the impurities removed from the air is returned through line 436, line 438 and valve 440 to the mixer 423 of the Carver-Greenfield system. Alternatively, in the event that this waste contains recoverable volatile chemicals or valuable chemicals which can be precipitated, it may be sent through line 442 and valve 444 to line 418 to the chemical recovery unit 420. The mixer of the Carver-Greenfield system may be supplied with sewage wastes and the like in addition to the other waste materials through line 446.

The air cleaning feature illustrated in FIG. 5 is not limited to petrochemical plants. Many industries make use of water-scrubbing operations for avoiding air pollution problems but encounter a problem of disposing of the water to which the air pollutants have been transferred. The present invention solves this problem by sending this waste water to the Carver-Greenfield system.

It will be understood that any combination of the various operations shown in FIGS. 2–5 may be utilized in a single industrial plant. It will further be understood that many other variations and combinations of the systems illustrated will be apparent to those skilled in the art and can be adapted for a particular industry or plant. The basic feature of the invention is the combination of a demineralizer with a Carver-Greenfield system in such a way as to make both systems economical in an overall combination. It has never been realized heretofore that the Carver-Greenfield system could be adapted to handle high mineral content waters as contrasted to concentrated organic wastes such as sewage and the like.

We claim:
1. A process for water treatment and reuse in a locality having domestic and industrial water requirements, comprising: subjecting a mineral-containing inlet water to a demineralization step to provide a substantially demineralized water effluent and a water fraction concentrated in mineral content, supplying a portion of the demineralized water effluent to domestic service and another portion of said demineralized water effluent to industrial service, collecting waste waters from the domestic facilities and waste waters from the industrial facilities, mixing the collected waste waters and the mineral concentrated water fraction from the demineralizer with a relatively nonvolatile fluidizing oil to obtain a mixture which will remain pumpable after removal of water therefrom, subjecting said mixture to dehydration by heat evaporation and condensation to provide a condensate water effluent and a slurry containing mineral and organic solids suspended in said fluidizing oil, separating the solids from the fluidizing oil and recycling the latter for continued operation, and returning at least a portion of the condensate water effluent from the dehydration step to industrial usage.

2. The process of claim 1 wherein at least a portion of the water effluents to industrial service is used for water cooling purposes.

3. The process of claim 1 wherein at least a portion of the demineralized water effluent is used in plant boilers thereby reducing scale problems.

4. The process of claim 1 wherein the locality is a natural gas treating plant, at least a portion of the water supplied to the industrial usage is used in cooling towers and at least a portion of the returned industrial waste water for dehydration and reuse is cooling tower blow down water.

5. The process of claim 4 wherein the natural gas treating plant includes an absorption operation for removal of acidic gases from the natural gas, said operation comprising circulating an absorption liquid between absorption and stripping steps, cooling the lean absorption liquid prior to absorption and heating the rich absorption liquid for stripping, and wherein at least a portion of the water effluent supplied to the plant is used in indirect heat exchange for cooling the lean absorption liquid.

6. The process of claim 5 wherein heat energy is recovered from the hot lean solution from the stripping step and is used to supply part of the heat energy requirement for treatment of the waste or mineral containing waters providing the service waters to the plant.

7. The process of claim 1 wherein the industry served includes a power plant having fuel burning engines, a portion of the water effluents supplied to industrial service is used to meet the water requirements of said engines, heat energy is recovered from the stack or exhaust gases from said engine and is used to provide at least a part of the heat energy requirement for treatment of the waste or mineral containing waters providing the industrial service waters.

8. The process of claim 1 wherein at least a portion of the water effluent from the dehydration step is used to remove pollutants from gases and the water containing said pollutants is returned to the dehydration operation.

References Cited

UNITED STATES PATENTS

| | | | |
|---|---|---|---|
| 3,232,847 | 1/1966 | Hoff | 203—11 |
| 2,151,079 | 3/1939 | Bowen | 159—17UX |
| 2,182,428 | 12/1939 | Fladmark | 159—48 |
| 2,189,083 | 2/1940 | Reukin | 23—100X |
| 2,524,753 | 10/1950 | Betts | 23—48 |
| 3,215,189 | 11/1965 | Bauer | 159—16 |
| 3,251,398 | 5/1966 | Greenfield | 159—47 |
| 3,286,763 | 11/1966 | Jacoby | 159—2X |
| 3,296,122 | 1/1967 | Karassik et al. | 210—2 |
| 3,349,827 | 10/1967 | Vincent | 159—4 |
| 3,405,037 | 10/1968 | Aronson et al. | 203—11X |

OTHER REFERENCES

International Symposium on Water Desalination, Beckman et al., October 1965 (SWD19), pp. 1–8.

NORMAN YODKOFF, Primary Examiner

F. E. DRUMMOND, Assistant Examiner

U.S. Cl. X.R.

159—47; 202—173, 205; 210—2